United States Patent
Kim et al.

(10) Patent No.: US 10,598,782 B2
(45) Date of Patent: Mar. 24, 2020

(54) MOVING OBJECT DETECTION DEVICE USING ULTRASONIC SENSOR, METHOD THEREOF, AND WARNING SYSTEM USING THE SAME

(71) Applicants: HYUNDAI MOTOR COMPANY, Seoul (KR); KIA MOTORS CORPORATION, Seoul (KR)

(72) Inventors: Bo Hyeon Kim, Jeollabuk-do (KR); In Young Choi, Jeonju-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/252,049

(22) Filed: Jan. 18, 2019

(65) Prior Publication Data

US 2019/0154828 A1    May 23, 2019

Related U.S. Application Data

(62) Division of application No. 15/683,273, filed on Aug. 22, 2017, now Pat. No. 10,234,558.

(30) Foreign Application Priority Data

Mar. 13, 2017  (KR) .................. 10-2017-0031253

(51) Int. Cl.
*G01S 15/931* (2020.01)
*G08G 1/16* (2006.01)
(Continued)

(52) U.S. Cl.
CPC ............ *G01S 15/931* (2013.01); *B60Q 1/525* (2013.01); *B60Q 9/00* (2013.01); *B60W 50/14* (2013.01);
(Continued)

(58) Field of Classification Search
CPC ........ G01S 15/52; G01S 15/87; G01S 15/931; G08B 13/19608; G08B 13/19695;
(Continued)

(56) References Cited

U.S. PATENT DOCUMENTS 6,834,232 B1 * 12/2004 Malhotra ............... G08G 1/163
340/903
9,162,643 B2  10/2015 Pech et al.
(Continued)

FOREIGN PATENT DOCUMENTS

JP     2006-232019 A    9/2006
JP     2008-140013 A    6/2008
(Continued)

*Primary Examiner* — Orlando Bousono
(74) *Attorney, Agent, or Firm* — Brinks Gilson & Lione

(57) ABSTRACT

A moving object detection device using an ultrasonic sensor, a method thereof, and a warning system using the same is provided. The moving object detection device includes: an ultrasonic sensor configured to receive a plurality of reflected signals per period; and a detector configured to divide a sensing distance of the ultrasonic sensor into a plurality of regions, detect a region of the plurality of regions as a region of interest (ROI) when an intensity of a reflected signal of the plurality of reflected signals exceeds a predetermined threshold in a region of the plurality of regions, and detect a moving object based on changes in the ROI.

3 Claims, 4 Drawing Sheets

(51) Int. Cl.
*G01S 15/87* (2006.01)
*B60W 50/14* (2020.01)
*G01S 15/52* (2006.01)
*B60Q 9/00* (2006.01)
*B60Q 1/52* (2006.01)

(52) U.S. Cl.
CPC .............. *G01S 15/52* (2013.01); *G01S 15/87* (2013.01); *G08G 1/161* (2013.01); *G08G 1/165* (2013.01); *G01S 2015/937* (2013.01)

(58) Field of Classification Search
CPC ...... G08G 1/161; G08G 1/165; H04N 13/218; H04N 13/271; B60Q 9/00; B60W 50/14
See application file for complete search history.

(56) References Cited

U.S. PATENT DOCUMENTS

| | | | |
|---|---|---|---|
| 9,310,484 | B2 | 4/2016 | Lee |
| 2003/0151541 | A1* | 8/2003 | Oswald ................. G01S 13/931 342/70 |
| 2015/0251600 | A1* | 9/2015 | Mochizuki ............. B60R 1/001 345/7 |
| 2016/0023598 | A1* | 1/2016 | Kohler ................. G01S 13/931 340/435 |
| 2016/0295198 | A1* | 10/2016 | Grossman ........ G08B 13/19695 |

FOREIGN PATENT DOCUMENTS

| | | |
|---|---|---|
| JP | 2012-064080 A | 3/2012 |
| JP | 2013-020458 A | 1/2013 |

* cited by examiner

MOVING OBJECT DETECTION DEVICE USING ULTRASONIC SENSOR, METHOD THEREOF, AND WARNING SYSTEM USING THE SAME

CROSS-REFERENCE TO RELATED APPLICATION

This application is a divisional application of U.S. patent application Ser. No. 15/683,273 (still pending), filed on Aug. 22, 2017, which claims priority to and the benefit of Korean Patent Application No. 10-2017-0031253, filed on Mar. 13, 2017. The entirety of all of related applications are hereby incorporated by reference.

FIELD

The present disclosure relates to a moving object detection device using an ultrasonic sensor, a method thereof, and a warning system using the same and, more particularly, to a technology for distinguishing between a moving object and a stationary object on the basis of data obtained using an ultrasonic sensor.

BACKGROUND

The statements in this section merely provide background information related to the present disclosure and may not constitute prior art.

Recently, a door-side object detection (DOD) system has been mounted in a variety of commercial vehicles such as intra-city buses and express buses in order to improve the safety of passengers getting into and out of the vehicles at bus stops.

The DOD system includes an ultrasonic sensor that is mounted around a door of the vehicle through which the passengers get on or off, detects an object on the basis of data obtained from the ultrasonic sensor, and warns a driver about a collision of the vehicle with the object to prevent an accident.

However, the DOD system warns the driver of the object without distinguishing whether the object detected by the ultrasonic sensor is a moving object or a stationary object, i.e., a stop sign, a streetlight, street trees or the like.

Therefore, even when the stationary object is detected, the driver should confirm carefully whether a person is moving around the door of the vehicle. The driver then can start the vehicle after safety is confirmed, and this may cause inconvenience to passengers in the vehicle as well as the driver.

SUMMARY

An aspect of the present disclosure provides a moving object detection device using an ultrasonic sensor, a method thereof, and a warning system using the same, which can inhibit the issuance of an unnecessary warning to a driver by distinguishing between a moving object and a stationary object on the basis of data obtained using the ultrasonic sensor.

In some forms of the present disclosure, a moving object detection device includes: an ultrasonic sensor configured to receive a plurality of reflected signals per period; and a detector configured to divide a sensing distance of the ultrasonic sensor into a plurality of regions, detect a region of the plurality of regions as a region of interest (ROI) when an intensity of a reflected signal of the plurality of reflected signals exceeds a predetermined threshold in a region of the plurality of regions, and detect a moving object on the basis of changes in the ROI.

The detector may determine an object in a ROI of a first reflected signal as a moving object when the ROI of the first reflected signal of the plurality of reflected signals does not correspond to a ROI of any subsequent reflected signals of the plurality of reflected signals.

The detector may be configured to: when the ROI of the first reflected signal is a first region of the plurality of regions, determine whether any one of the first region, a second region, or a third reason of the plurality of regions corresponds to a ROI of second reflected signal, wherein the second region and the third region are adjacent to the first region; when the second region is determined as the ROI of the second reflected signal, determine whether any one of the second region, the first region, or a fourth region of the plurality of regions corresponds to a ROI of third reflected signal, wherein the second region and the fourth region are adjacent to the second region; and when the ROI of any of the reflected signals is not determined, determine an object in the first region of the first reflected signal is a moving object.

The detector may be configured to compare the intensity of any reflected signal of the plurality of reflected signals, except a first reflected signal, with a predetermined threshold, to which hysteresis has been applied, and detect the ROI.

In other forms of the present disclosure, a method for detecting a moving object using an ultrasonic sensor includes: receiving, with an ultrasonic sensor, a plurality of reflected signals per period; and dividing, with a detector, a sensing distance of the ultrasonic sensor into a plurality of regions, detecting, with the detector, a region of the plurality of regions as a region of interest (ROI) when an intensity of a reflected signal of the plurality of reflected signals exceeds a predetermined threshold in a region of the plurality of regions, and detecting a moving object on the basis of changes in the ROI.

The detecting of the moving object may include determining an object in a ROI of a first reflected signal as a moving object when the ROI of the first reflected signal of the plurality of reflecting signals does not correspond to a ROI of any subsequent reflected signals of the plurality of reflected signals.

The detecting of the moving object may include: when the ROI of the first reflected signal is a first region of the plurality of regions, determining whether any one of the first region, a second region, or a third region of the plurality of regions corresponds to a ROI of second reflected signal, wherein the second region and the third reason are adjacent to the first region; when the second region is determined as the ROI of the second reflected signal, determining whether any one of the second region, the first region, or a fourth region of the plurality of regions corresponds to a ROI of third reflected signal, wherein the second region and the fourth region are adjacent to the second region; and when the ROI of any of the reflected signals is not determined, determining an object in the first region of the first reflected signal is a moving object.

The detecting of the moving object may include comparing the intensity of any reflected signal of the plurality of reflected signals, except a first reflected signal, with a predetermined threshold, to which hysteresis has been applied, and detecting the ROI.

In other forms of the present disclosure, a warning system of a vehicle includes: a moving object detection device configured to divide a sensing distance of an ultrasonic sensor into a plurality of regions, detect a region of the plurality of regions as a region of interest (ROI) when an intensity of a reflected signal of the plurality of reflected signals exceeds a predetermined threshold in a region of the plurality of regions, and detecting a moving object on the basis of changes in the ROI; a display device configured to output a warning message or image; a warning device configured to output various warning sounds; and a control device configured to output, with the display device, the warning message or image when the moving object detection device detects a stationary object, and warn, with the display device and the warning device, a driver when the moving object detection device detects a a moving object.

The moving object detection device may be configured to determine an object in a ROI of a first reflected signal as a moving object when the ROI of the first reflected signal of the plurality of reflected signals does not correspond to a ROI of any subsequent reflected signals of the plurality of reflected signals.

The moving object detection device may be configured to: when the ROI of the first reflected signal is a first region of the plurality of regions, determine whether any one of the first region, a second region, or a third reason of the plurality of regions corresponds to a ROI of second reflected signal, wherein the second region and the third region are adjacent to the first region; when the second region is determined as the ROI of the second reflected signal, determine whether any one of the second region, the first region, or a fourth region of the plurality of regions corresponds to a ROI of third reflected signal, wherein the second region and the fourth region are adjacent to the second region; and when the ROI of any of the reflected signals is not determined, determine an object in the first region of the first reflected signal is a moving object.

The moving object detection device may be configured to compare the intensity of any reflected signal of the plurality of reflected signals, except a first reflected signal, with a predetermined threshold, to which hysteresis has been applied, and detect the ROI.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
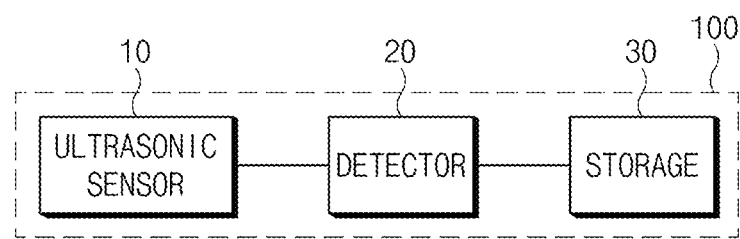
FIG. 1 illustrates the configuration of a moving object detection device using an ultrasonic sensor.

The drawings described herein are for illustration purpose only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 illustrates the configuration of a moving object detection device using an ultrasonic sensor.

As illustrated in FIG. 1, a moving object detection device 100, in some forms of the present disclosure, includes an ultrasonic sensor 10, a detector 20, and a storage 30.

With respect to each of the aforementioned elements, first, the ultrasonic sensor 10 may be mounted in the vicinity of front and rear doors of a vehicle (for example, an intra-city bus) to detect an object within a predetermined distance. In other words, the ultrasonic sensor 10 may transmit an ultrasonic wave to the object and receive a signal returning thereto after the ultrasonic wave is reflected by the object, and detect a distance to an object and a size of the object on the basis of the reflected signal.

Figure 2:
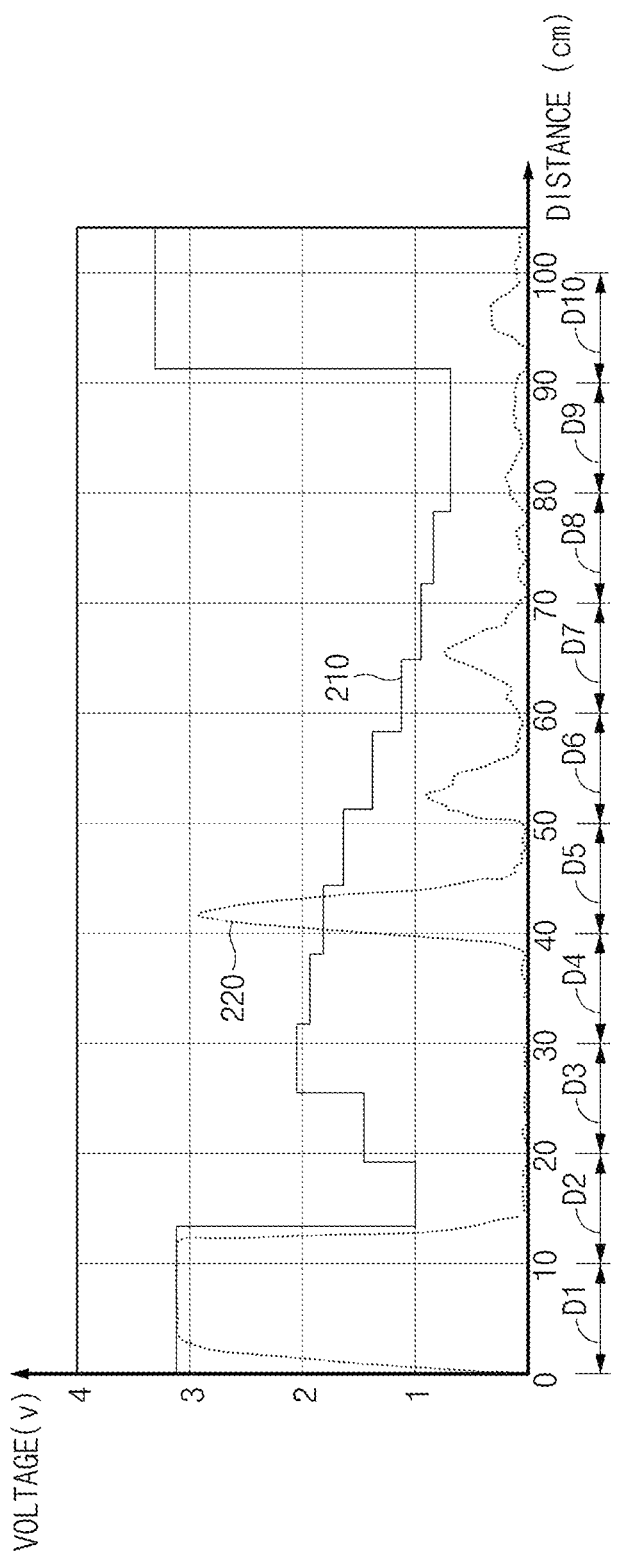
FIG. 2 illustrates an example of a reflected signal which is received by an ultrasonic sensor.

The reflected signal which is received by the ultrasonic sensor 10 is illustrated by way of example in FIG. 2.

In FIG. 2, a horizontal axis represents a sensing distance (cm) of the ultrasonic sensor 10, and a vertical axis represents the intensity (for example, voltage) of a reflected signal which is received by the ultrasonic sensor 10. In FIG. 2, "210" represents a threshold, and "220" represents a waveform of the reflected signal which is received by the ultrasonic sensor 10.

Here, the ultrasonic sensor 10 may receive a predetermined number of reflected signals per period. For example, the ultrasonic sensor 10 may receive the reflected signal five times every two seconds. In other words, the ultrasonic sensor 10 may perform a process of transmitting an ultrasonic wave and receiving a reflected signal corresponding thereto five times for two seconds. Here, the period of the ultrasonic sensor 10 may be changed in accordance with circumstances.

The detector 20 may divide the sensing distance of the ultrasonic sensor 10 into predetermined regions (for example, intervals of 10 cm).

As illustrated in FIG. 2, the sensing distance may be divided into a first region D1 of 0-10 cm, a second region D2 of 10 cm-20 cm, a third region D3 of 20 cm-30 cm, a fourth region D4 of 30 cm-40 cm, a fifth region D5 of 40 cm-50 cm, a sixth region D6 of 50 cm-60 cm, a seventh region D7 of 60 cm-70 cm, an eighth region D8 of 70 cm-80 cm, a ninth region D9 of 80 cm-90 cm, a tenth region D10 of 90 cm-100 cm, according to distance. Here, the interval 10 cm between the regions may be changed. For example, the interval may be set to 5 cm, and the number of regions may be twenty (20).

In addition, the detector 20 may detect a region in which a voltage of a reflected signal which is received by the ultrasonic sensor 10 exceeds a threshold from the divided regions. For example, a region in which a voltage of a reflected signal exceeds a threshold is the fifth region D5 in FIG. 2. Here, the detector 20 may apply a first threshold to a first reflected signal which is firstly received by the ultrasonic sensor, and apply a second threshold, to which hysteresis has been applied, to subsequent reflected signals (a second reflected signal, a third reflected signal, a fourth reflected signal, and a fifth reflected signal, which are subsequently received by the ultrasonic sensor). For example, hysteresis may be set to −0.2V. Thus, when the first threshold is 2V, the second threshold may be 1.8V.

Meanwhile, since the ultrasonic sensor 10 receives a plurality of reflected signals per period, the detector 20 may detect a region of interest (ROI) with respect to each of the plurality of reflected signals by determining a region in which a voltage of each reflected signal exceeds a threshold as a ROI.

In some forms of the present disclosure, the detector 20 may determine an object located in a ROI of a first reflected signal as a stationary object when the ROI of the first reflected signal corresponds to a ROI of each of subsequent reflected signals. On the contrary, the detector 20 may determine an object located in the ROI of the first reflected signal as a moving object when the ROI of the first reflected signal does not correspond to the ROI of each of the subsequent reflected signals.

In other forms of the present disclosure, the detector 20 may detect changes in ROIs with respect to all reflected signals in a single period in sequential order such that when a ROI in which a voltage of a first reflected signal exceeds a threshold is region D5, it is determined whether or not any one of region D5 and adjacent regions D4 and D6 corresponds to a ROI of a second reflected signal. When region D4 is determined as the ROI of the second reflected signal, it is determined whether or not any one of region D4 and adjacent regions D3 and D5 corresponds to a ROI of a third reflected signal, and may determine an object in region D5 of the first reflected signal as a stationary object when there are ROIs with respect to all the reflected signals. On the contrary, the detector 20 may determine an object in region D5 of the first reflected signal as a moving object when there are no ROIs with respect to all the reflected signals.

Since a ROI with respect to each of the reflected signals is detected by taking the adjacent regions into consideration, a chattering phenomenon occurring at a boundary between the regions may be inhibited.

In more detail, when the ROI of the first reflected signal is region D5, it may determine whether or not any one of regions D4, D5, and D6 of the second reflected signal is a ROI.

Next, when region D4 of the second reflected signal is determined as a ROI, it may determine whether or not any one of regions D3, D4, and D5 of the third reflected signal is a ROI. Here, when it is determined that any one of regions D4, D5, and D6 of the second reflected signal is not a ROI, an object located in region D5 of the first reflected signal may be determined as a moving object.

Thereafter, when region D5 of the third reflected signal is determined as a ROI, it may determine whether or not any one of regions D4, D5, and D6 of the fourth reflected signal is a ROI. Here, when it is determined that any one of regions D3, D4, and D5 of the third reflected signal is not a ROI, an object located in region D5 of the first reflected signal may be determined as a moving object.

Thereafter, when region D4 of the fourth reflected signal is determined as a ROI, it may determine whether or not any one of regions D3, D4, and D5 of the fifth reflected signal is a ROI. Here, when it is determined that any one of regions D4, D5, and D6 of the fourth reflected signal is not a ROI, an object located in region D5 of the first reflected signal may be determined as a moving object.

Then, when region D4 of the fifth reflected signal is determined as a ROI, an object located in region D5 of the first reflected signal may be determined as a stationary object. Here, when it is determined that any one of regions D3, D4, and D5 of the fifth reflected signal is not a ROI, an object located in the region D5 of the first reflected signal may be determined as a moving object.

Meanwhile, the detector 20 may detect information about a ROI of each of the plurality of reflected signals which are received in a single period (for two seconds), wherein the ROI is a region in which a voltage of each reflected signal exceeds a threshold, and store the information in the storage 30.

Figure 3:
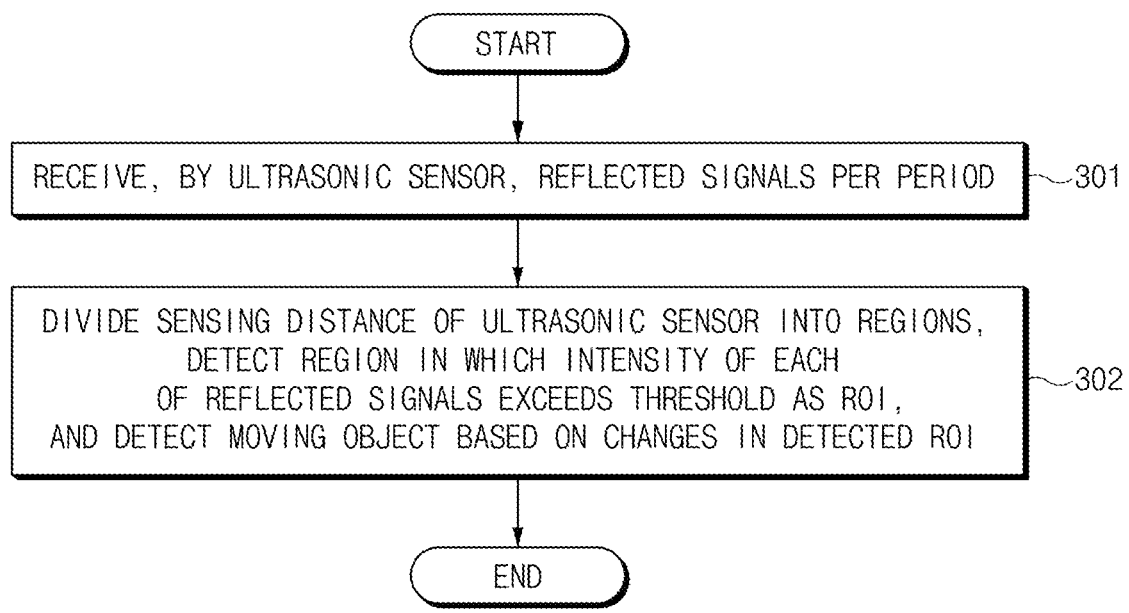
FIG. 3 illustrates a flowchart of a method for detecting a moving object using an ultrasonic sensor.

FIG. 3 illustrates a flowchart of a method for detecting a moving object using an ultrasonic sensor in some forms of the present disclosure.

First of all, the ultrasonic sensor 10 may receive a plurality of reflected signals per period in operation 301.

Next, the detector 20 may divide a sensing distance of the ultrasonic sensor 10 into a plurality of regions, detect a region in which an intensity of each of the reflected signals exceeds a threshold as a region of interest (ROI), and detect a moving object based on changes in the detected ROI in operation 302.

Here, the detector 20 may determine an object in a ROI of a first reflected signal as a stationary object when the ROI of the first reflected signal corresponds to a ROI of each of subsequent reflected signals. On the contrary, the detector 20 may determine an object in the ROI of the first reflected signal as a moving object when the ROI of the first reflected signal does not correspond to the ROI of each of the subsequent reflected signals.

In addition, the detector 20 may detect changes in ROIs with respect to all reflected signals in a single period in a sequential order such that when a ROI in which a voltage of a first reflected signal exceeds a threshold is region D5, it is determined whether or not any one of region D5 and adjacent regions D4 and D6 corresponds to a ROI of a second reflected signal, and when region D4 is determined as the ROI of the second reflected signal, it is determined whether or not any one of region D4 and adjacent regions D3 and D5 corresponds to a ROI of a third reflected signal, and may determine an object in region D5 of the first reflected signal as a stationary object when there are ROIs with respect to all the reflected signals. On the contrary, the detector 20 may determine an object in region D5 of the first reflected signal as a moving object when there are no ROIs with respect to all the reflected signals.

In addition, the detector 20 may compare a threshold, to which hysteresis has been applied, with the intensity of each of the reflected signals, except the first reflected signal, to detect the ROI.

Figure 4:
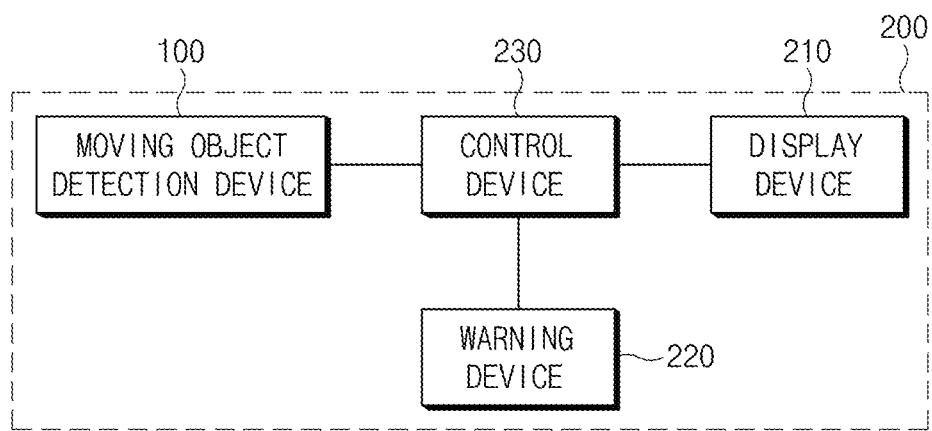
FIG. 4 illustrates the configuration of a warning system of a vehicle.

FIG. 4 illustrates the configuration of a warning system of a vehicle in some forms of the present disclosure.

As illustrated in FIG. 4, a warning system 200 of a vehicle, in some forms of the present disclosure, includes the moving object detection device 100, a display device 210, a warning device 220, and a control device 230.

The moving object detection device 100 may divide a sensing distance of the ultrasonic sensor 10 into a plurality of regions, detect a region in which an intensity of each of the reflected signals exceeds a threshold as a region of interest (ROI), and detect a moving object on the basis of changes in the detected ROI.

Here, the moving object detection device 100 may determine an object in a ROI of a first reflected signal as a stationary object when the ROI of the first reflected signal corresponds to a ROI of each of subsequent reflected signals. On the contrary, the moving object detection device 100 may determine an object in the ROI of the first reflected signal as a moving object when the ROI of the first reflected signal does not correspond to the ROI of each of the subsequent reflected signals.

In addition, the moving object detection device 100 may detect changes in ROIs with respect to all reflected signals in a single period in sequential order such that when a ROI in which a voltage of a first reflected signal exceeds a threshold is region D5, it is determined whether or not any one of region D5 and adjacent regions D4 and D6 corresponds to a ROI of a second reflected signal, and when region D4 is determined as the ROI of the second reflected signal, it is determined whether or not any one of region D4 and adjacent regions D3 and D5 corresponds to a ROI of a third reflected signal, and may determine an object in region D5 of the first reflected signal as a stationary object when there are ROIs with respect to all the reflected signals. On the contrary, the moving object detection device 100 may determine an object in region D5 of the first reflected signal as a moving object when there are no ROIs with respect to all the reflected signals.

In addition, the moving object detection device 100 may compare a threshold, to which hysteresis has been applied, with the intensity of each of the reflected signals, except the first reflected signal, to detect the ROI.

The display device 210 may display a variety of information under the control of the control device 230. In particular, the display device 210 may display a warning message or image as a visual warning.

The display device 210 may be at least one of a liquid crystal display (LCD), a thin film transistor-liquid crystal display (TFT LCD), an organic light-emitting diode (OLED), a flexible display, a 3D display, and a dual display that displays different images depending on viewing direction.

The warning device 220 may output various warning sounds under the control of the control device 230.

The control device 230 generally controls the aforementioned respective elements to perform the functions thereof normally.

In addition, when a stationary object is detected by the moving object detection device 100, the control device 230 may warn a driver of the detected result through the display device 210.

In addition, when a moving object is detected by the moving object detection device 100, the control device 230 may warn the driver of the detected result through the display device 210 and output a warning sound through the warning device 220. In other words, when the moving object is detected by the moving object detection device 100, the control device 230 may control the display device 210 to display the warning message or image, and control the warning device 220 to output the warning sound.

As set forth above, in some forms of the present disclosure, the issuance of an unnecessary warning to a driver can be prevented by distinguishing between a moving object and a stationary object on the basis of data obtained using the ultrasonic sensor.

In addition, a moving object can be detected with high accuracy by inhibiting a chattering phenomenon that occurs at a boundary of regions.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A warning system of a vehicle, the warning system comprising:
   a memory; and
   a processor configured to execute instructions stored in the memory and to:
      divide a sensing distance of an ultrasonic sensor into a plurality of regions;
      when an intensity of a reflected signal of a plurality of reflected signals exceeds a predetermined threshold in a region of the plurality of regions, detect a region of the plurality of regions as a region of interest (ROI);
      detect a moving object based on changes in the ROI;
      output a warning message or image;
      output various warning sounds;
      when the moving object detection device detects a stationary object, output the warning message or image;
      when the moving object detection device detects a moving object, warn a driver; and
      when a ROI of first reflected signal of the plurality of reflected signals does not correspond to a ROI of any subsequent reflected signal of the plurality of reflected signals, determine an object in the ROI of the first reflected signal as a moving object.

2. The warning system of claim 1, wherein the processor is configured to:
   when the ROI of the first reflected signal is a first region of the plurality of regions, determine whether any one of the first region, a second region, or a third reason of the plurality of regions corresponds to a ROI of second reflected signal, wherein the second region and the third region are adjacent to the first region;
   when the second region is determined as the ROI of the second reflected signal, determine whether any one of the second region, the first region, or a fourth region of the plurality of regions corresponds to a ROI of third reflected signal, wherein the second region and the fourth region are adjacent to the second region; and
   when the ROI of any of the reflected signals is not determined, determine an object in the first region of the first reflected signal is a moving object.

3. The warning system of claim 1, wherein the processor is configured to:
   compare the intensity of any reflected signal of the plurality of reflected signals excluding the first reflected signal with the predetermined threshold, wherein hysteresis is applied to the predetermined threshold; and
   detect the ROI.

* * * * *